United States Patent
Penna

(10) Patent No.: US 6,222,556 B1
(45) Date of Patent: Apr. 24, 2001

(54) FAST PROCESSING OF IMAGE PRIMITIVES

(75) Inventor: David E. Penna, Redhill (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/099,252

(22) Filed: Jun. 18, 1998

(30) Foreign Application Priority Data

Jun. 18, 1997 (GB) .................................................. 9712684

(51) Int. Cl.$^7$ ........................................................ G06F 3/14
(52) U.S. Cl. .................... 345/433; 345/435; 345/136; 345/440
(58) Field of Search ................... 345/433, 435, 345/436, 430, 136, 440

(56) References Cited

U.S. PATENT DOCUMENTS

| | | | |
|---|---|---|---|
| 4,885,703 | 12/1989 | Deering | 364/522 |
| 4,930,091 | * 5/1990 | Schroeder et al. | 364/522 |
| 5,590,248 | * 12/1996 | Zarge et al. | 395/121 |
| 5,689,577 | * 11/1997 | Arata | 382/128 |
| 5,805,868 | * 9/1998 | Murphy | 395/502 |
| 5,872,902 | * 2/1999 | Kuchkuda et al. | 395/130 |

FOREIGN PATENT DOCUMENTS

| | | | |
|---|---|---|---|
| 0656609A1 | 6/1995 | (EP) | G06T/15/10 |
| 0707289 | 9/1995 | (EP) | G06T/17/20 |
| WO9417486 | 8/1994 | (WO) | G06F/15/72 |

OTHER PUBLICATIONS

Nuclear Science Symposium and Medical Imaging Conference, 1994.

* cited by examiner

Primary Examiner—Matthew Luu
Assistant Examiner—Daniel Chung
(74) Attorney, Agent, or Firm—Russell Gross

(57) ABSTRACT

A method and apparatus are described for generating images from assembled polygonal image primitives. As a precursor to rendering, an ordered list of the primitives is assembled with degenerate cases being identified and discarded. Following removal of the degenerate cases, the remaining primitives undergo a series of tests to identify special cases whereby account can be taken of the rendering technique of omitting the right hand pixel of a span and bottom span of a primitive to simplify the rendering operation.

11 Claims, 3 Drawing Sheets

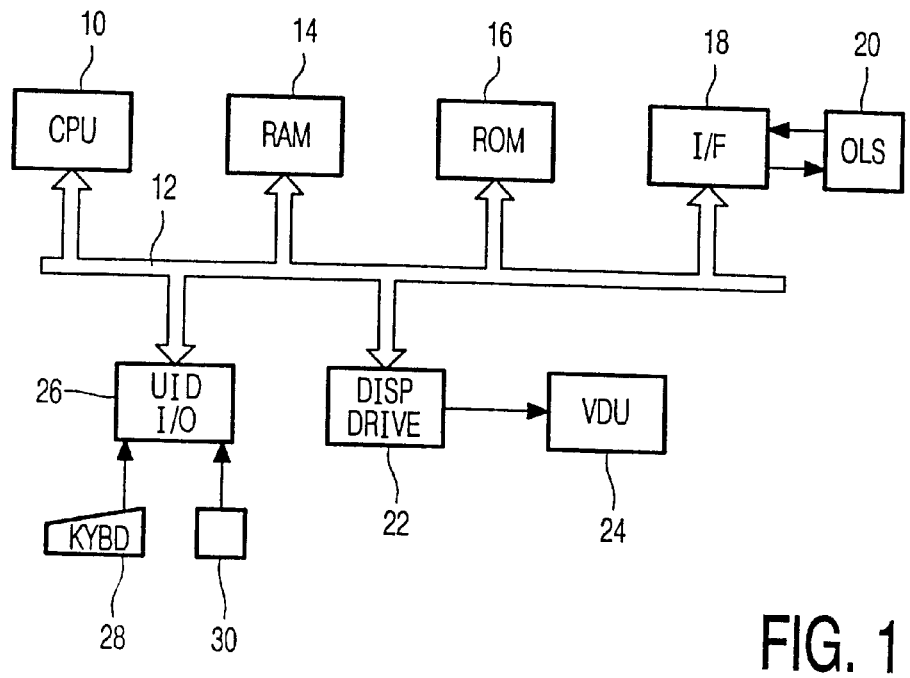
FIG. 1
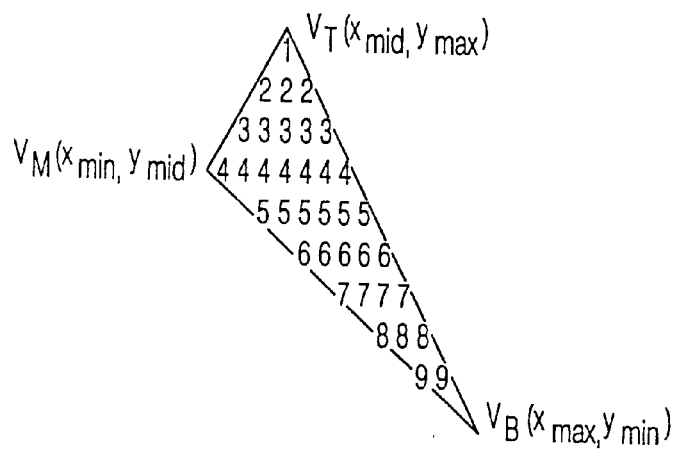
FIG. 2
FIG. 3

$\overset{\displaystyle 1\,1\,1\,1\,1\,1\,1\,1\,1\,1\,1\,0}{0}$

FIG. 4

$\overset{V_T}{\underset{\displaystyle 0\,0\,0\,0\,0\,0\,0\,0\,0\,0\,0\,0\,0\,0\,0}{0}} \; y(V_M)=y(V_B)$

FAST PROCESSING OF IMAGE PRIMITIVES

BACKGROUND OF THE INVENTION

The present invention relates to a method of image processing and an image processing apparatus. In particular, the present invention relates to the rendering of images composed from a number of discrete polygonal surfaces, known as image primitives.

It is a common technique in real time consumer graphics to model objects as meshes of polygons, especially triangles for ease of handling. This is particularly the case for three-dimensional object modelling wherein, to obtain a two-dimensional image from three-dimensional image data, the polygons making up the object surface in three-dimensional space are projected into two-dimensional space and, following any necessary calculation or reference to look-up tables, appropriate pixel values (including colour, texture etc.) are mapped onto pixel positions within the projected two-dimensional polygon. The calculation following the translation of the polygons from three- to two-dimensional space is suitably handled by a processor pipeline in order to produce the set of display pixel values.

An example of such a processor pipeline for use in a 3D graphics display system, and comprising a series coupled chain of polygon processors, is described in U.S. Pat. No. 4,855,703 (Deering/Schlumberger). Following translation of polygons from three to two dimensions, the polygons are sorted into scan order by reference to the first display pixel line on which they appear. Prior to processing of a scan line, each newly-introduced polygon is loaded into a respective one of the processors in the chain where they are also stored, such that their contribution to successive scan lines may also be derived. When a scan line is reached which is not covered by a particular polygon (i.e. the first clear line below the bottom vertex of, say, a triangular polygon), that polygon is unloaded from the processor in the chain to make way for new polygon data. After processing of a scan line, the pixel data for that line may be sent directly to a display (such as a cathode ray tube [CRT] device) or may be stored in a frame buffer for later accessing.

Before the scan line processing can begin, there is the preliminary process of preparing the two-dimensional polygons which requires, amongst other actions, the calculation of edge slopes, which preliminary process can often consume sufficient computational resources to limit the overall performance of the system. A technique which seeks to simplify this stage somewhat is described in U.S. Pat. No. 4,930,091 (Schroeder & Deering/Schlumberger) which technique is applied to the system of the above-referenced U.S. Pat. No. 4,855,703. In the technique, a triangle classification is introduced whereby a plurality of parameters of a triangle are calculated from the supplied coordinates of the vertices. These parameters are then used to address a look-up table containing a triangle classification with all possible forms of triangle being covered by the varying combinations of parameters: the triangle classification, once read from the look-up table, determines how that triangle is to be processed in the pipeline. In the case of degenerate triangles, where all three vertices lie on a line (such that the triangle itself is just a line) or they are so close together that the triangle does not enclose a pixel (and hence would not show up in the displayed image) no further processing is undertaken.

SUMMARY OF THE INVENTION

Whilst identifying these degenerate cases avoids some of the unnecessary processing of an image, we have recognised that further savings are desirable, and it is accordingly an object of the present invention to improve the efficiency of the graphics rendering process.

In accordance with the present invention there is provided a method of image processing for rendering a two-dimensional pixel image composed of a plurality of polygonal image primitives, said method comprising the steps of:

(a) sorting the image primitives in relation to their locations within the completed image and generating an ordered list of said primitives;

(b) designating image primitives having a maximum horizontal or maximum vertical dimension of one pixel as degenerate and removing said degenerate primitives from the list prior to rendering;

(c) designating image primitives having a maximum horizontal or maximum vertical dimension of two pixels as special, classifying said special primitives according to their arrangement of vertices, and identifying said special primitives in the list; and (d) rendering the image with those special primitives identified in step (c) being treated according to their particular classification, and for each other primitive, for each scan line crossed by that primitive, ignoring the primitive contribution to an end pixel of that part of each such scan line crossed by the image primitive together with all pixels of a predetermined one of the uppermost and lowermost pixels lines crossed by the image primitive.

The invention makes use of the observation that in certain cases other than the initial degenerate primitives the full computation is not necessary. By identifying these cases and using a simplified computation according to the primitives classification in step (c) above, we have recognised that it is possible to save significant processing time where there are many small polygons in the scene, as is likely to occur where objects are being viewed at a considerable distance (such that each polygon is small by the time it has been projected onto the 2D screen) and for the display of objects which have been composed out of a very large number of small polygons to simulate a smoothly curved surface.

Of the per-primitive pixel contributions to be ignored, suitably the right hand pixel of each scan line part covered by a primitive and the lowermost pixel line are selected: this helps to avoid rendering problems at primitive boundaries. The special primitives fall into a number of categories depending on their arrangement. Each class of special primitive has a common rendering technique which is recited in the claims attached hereto, and will be apparent from the following description of embodiments of the invention.

The initial step of sorting the image primitives may take into account more than just the x,y location of the vertices. For example, where each image primitive has an associated depth value, the step of sorting may further comprise sorting of the images primitives according to their respective depth values. Alternatively, or additionally, where each image primitive has an associated transparency value, the step of sorting may further comprise deleting from the list those primitives wholly covered by one or more opaque primitives: in this way no time is wasted on trying to render either degenerate or occluded primitives.

Also in accordance with the present invention there is provided an image processing apparatus comprising a data processor coupled with first and second memories, the first memory holding image primitive data for processing and the second holding an operating program for the data processor, when operating according to the operating program the data processor providing:

means for sorting the image primitives on the basis of the data in the first memory and in relation to their locations within a completed image and generating an ordered list of said primitives;

means for designating image primitives having a maximum horizontal or maximum vertical dimension of one pixel as degenerate and arranged to remove said degenerate primitives from the list prior to rendering;

means for designating image primitives having a maximum horizontal or maximum vertical dimension of two pixels as special and arranged to classify said special primitives according to their arrangement of vertices, and identify said special primitives in the list; and image rendering means arranged to render an image from the data in the first memory, with those primitives identified as special being treated according to their particular classification, and for each other primitive, for each scan line crossed by that primitive, being configured to ignore the primitive contribution to an end pixel of that part of each such scan line crossed by the image primitive together with all pixels of a predetermined one of the uppermost and lowermost pixels lines crossed by the image primitive.

BRIEF DESCRIPTION OF THE DRAWINGS

The invention will now be described by way of example only, in terms of a triangular primitive system although it will be recognised that the principles described hereinafter are similarly applicable to polygonal primitives having more than three vertices. The invention is described with reference to the accompanying drawings, in which:

FIG. 1 is a block schematic diagram of an image processing system suitable to implement the present invention;

FIG. 2 represents a conventional scan line arrangement for pixels in a triangular image primitive;

FIGS. 3 to 8 represent contributing and non-contributing pixels in different special case primitives.

DETAILED DESCRIPTION

Figure 9:
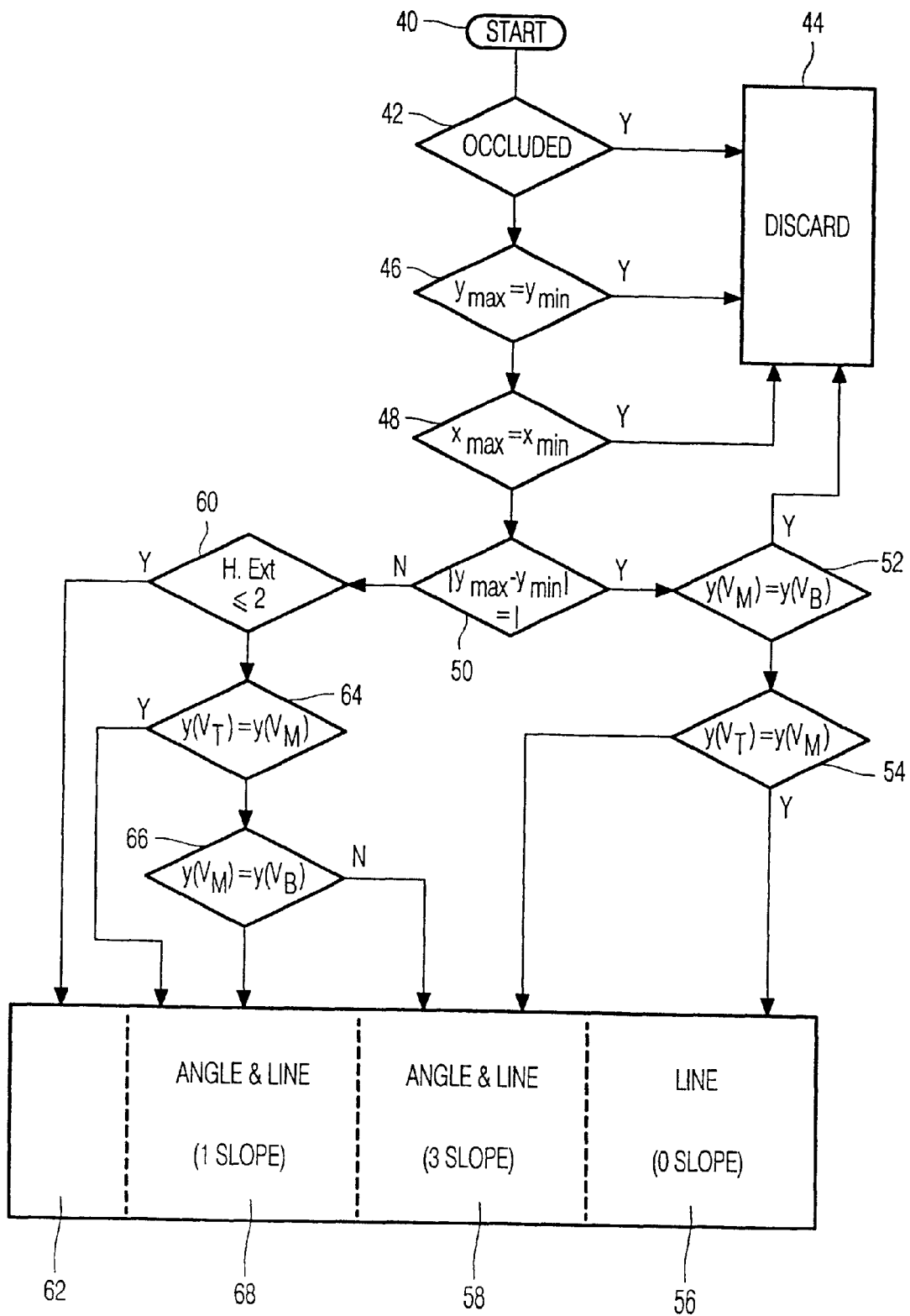
FIG. 9 is a flow chart illustrating a process of image primitive sorting and classification embodying the present invention.

A data processing system configured as an image processing apparatus is shown in FIG. 1. The system has a processing unit CPU 10, arranged to process three dimensional image data to produce for display a two-dimensional view of objects modelled in a virtual-three dimensional world. The CPU 10 is coupled via data and address bus 12 to random access and read-only memories RAM 14 and ROM 16 and also, via a suitable interface 18, to a further (off-line) data store OLS 20. The OLS 20 suitably provides the source of three-dimensional data and instructions controlling the operation of the CPU 10 from a permanent storage device such as a magnetic disc, an optical disc, a magneto-optical disc or other suitable storage medium. The main constraint on the form of OLS is that it be capable of supplying data, via the interface 18 and bus 12, to the CPU 10 at the required rate.

Also connected to the bus 12 is a frame buffer and display driver stage 22 arranged to generate video images on a connected video monitor VDU 24. In order to enable user control or contribution for the image generation process, a user input device interface 26 is connected to the bus 12 with input devices such as keyboard 28 and mouse 30 connected to the interface.

Three dimensional data is stored as definitions of the position of polyhedra vertices in a three-dimensional co-ordinate space. The two-dimensional view of the three-dimensional data generated on VDU 24, on a frame-by-frame basis, is produced by considering the vertices as being connected by straight lines, thereby defining a net of flat polygons. A view is rendered by considering each polygon in turn, possibly after performing back face culling, etc., so as to remove polygons which are not visible from the particular view under consideration. Thereafter, a list of polygons may be defined, which ensures that the polygons are rendered in the correct order.

For the purposes of illustration, a conventional technique for polygon rendering will initially be considered with reference to FIG. 2 which shows a triangular primitive. A common technique for rendering a triangle is to start at the top and draw "spans" until the triangle is complete, where a span is that part of a triangle which is covered by one row of screen pixels. The pixels belonging to each span are shown with their span number in FIG. 2.

The processing starts by sorting the three vertices in the vertical (y) direction such that there is a top, middle and bottom vertex, shown as $V_T$, $V_M$, and $V_B$. Once this has been done the triangle can be classified into one of four categories. If the top and middle vertices have the same y value then it is flat topped, if the middle and bottom have the same y value then it is flat bottomed. If all three vertices have the same y value then the triangle is degenerate and, as will be explained below, need not be drawn. The remaining two cases are the most common for reasonably large triangles, although not necessarily for smaller ones covering only a few pixels, and cover the situation where the three vertices all have different y values. One is the left-split case (as illustrated in FIG. 2) where the left side of the triangle is split into two edges with vertex $V_M$ at the junction of these two edges. The right-split case occurs when the right hand edge is split. In each of these four cases (the degenerate case having been excluded) all the edge slopes of the primitive are computed. For flat topped and flat bottomed triangles there are two slopes to compute while for the left-/right-split cases there are three. the procedure for flat-topped triangles of height 2 pixels, width N pixels is to draw a horizontal line of (N−1) pixels from the left hand vertex.

The next case is that of a flat bottomed primitive (two vertices at $Y_{min}$) with a height of 2 pixels and any width. The inverse of the previous case, the horizontal line of pixels is now the bottom line of the primitive and is therefore not drawn whilst the single top pixel is to be considered as the right-hand of a span and is similarly not drawn, as indicated by FIG. 5. The result is accordingly for this case draw nothing.

The next case is flat topped (FIG. 6) or flat bottomed (FIG. 7) primitives of width 2 pixels and of any height: note that width here refers to the area covered by the primitive and not horizontal extent ($x_{max}-x_{min}$). Here a vector (i.e. a single line of pixels) is to be drawn, with only one slope needing to be calculated together with the length of vector to be drawn. There is no need in this case for horizontal slope calculation of, for example, texture values.

The final case has a width (again not horizontal extent) of 2 pixels and any height, but is neither flat topped nor flat bottomed, as shown in FIG. 8. In this case, the slopes for all three edges need to be calculated but again there is a saving coming from the fact that the resulting pixel pattern will be a simple line with no horizontal slope calculations required.

A generalised selection process for sorting the primitives is shown in the flow chart of FIG. 9. From the start 40, an optional first test at step 42 is whether or not the primitive is occluded, for example for hidden surface removal. As will be well understood, the question of occlusion may be more than a simple yes/no test, depending on the total or partial translucency of overlapping primitives, and may comprise a recursive loop test as additional primitives are added to an image, as in the well known z-buffering algorithm, although this will occur after the process of FIG. 8. If the test at step 42 is included, and indicates the primitive to be occluded, the primitive is discarded (at 44), else it is passed to step 46.

At step 46, the vertical height ($y_{max}-y_{min}$) is checked and, if equal to one pixel (i.e. if $y_{max}=y_{min}$), the primitive is degenerate and discarded. In like It is important to note that pixels should not be rendered twice where they contain a part on either side of an edge where two triangles join. Avoidance of this double rendering is partly to save drawing time but more particularly to eliminate errors which can occur. In particular, if the pixels are translucent, such that the display pixel colour/texture contains contributions from one or more primitives behind the front-most primitive, the relative contributions of the front and overlaid primitives will be miscalculated if the pixel is considered twice. This might result in, for example, a pixel appearing dimmer than it should be.

In order to avoid this overlap, it is known to leave the right hand pixel of each span undrawn and to leave the bottom span undrawn such that pixels on the boundary of two primitives will only be considered for one of those two primitives. It is because of this procedural step that the degenerate case above does not need any drawing operations, since it contains only one span, which is the bottom span and hence excluded from consideration.

The applicants have recognised that further processing may be saved as a result of this step of not considering certain pixel primitive contributions, by identifying as special cases those primitives capable of simplified treatment having discounted those pixels to be ignored. These special cases, and the simplified treatment each receives, are illustrated in the pixel layout diagrams of FIGS. 3 to 8, in which a 0 represents a pixel covered by the primitive but which is not drawn (for the reasons explained above), a 1 represents a pixel which must drawn, and the subscripts 'max', 'mid' and 'min' respectively identify maximum, intervening, and minimum values when applied to screen coordinates at the triangle vertices.

The first special case is those primitives having a horizontal top (two vertices at $y_{max}$) and a vertical extent ($y_{max}-y_{min}$) of 2 pixels. Where the top width ($x_{max}-x_{min}$ in this instance) is 2 pixels, the resultant rendering requires just a single pixel at the vertex location, as shown in FIG. 3. Where the top width is greater than 2 pixels, a simple horizontal line of pixels is required, as shown in FIG. 4. With the right hand pixel contribution being dropped in all cases, manner, step 48 checks the horizontal extent from the furthest left to the furthest right of the vertices ($x_{max}-x_{min}$) and again, if equal to one pixel, the primitive is degenerate and is discarded.

At step 50, a check is made as to whether the vertical extent is equal to two pixels (remembering the primitives of height less than or equal to one pixel have already been discarded as degenerate). If so, step 52 checks whether it is flat-bottomed (as in FIG. 5) and, if so, it is discarded. If the check of step 52 is negative, a further check is made at step 54 as to whether the primitive is flat-topped (as in FIGS. 3 and 4) and, if so, the primitive is entered on the rendering list at 56 with the identifier that just a horizontal line need be drawn, from the top left vertex and of length ($V_T-V_M-1$) pixels. If check 54 is also negative, the primitive has no horizontal edge and is entered on the rendering list at 58 with the identifier that no horizontal slope calculation is required.

If step 50 is negative, that is to say the vertical extent is greater than two pixels, the horizontal extent is checked at step 60 and, if also greater than two pixels, the primitive does not form one of the special cases. Accordingly, the pixel is entered on the rendering list at 62 without any identifier indicating special treatment.

If the horizontal extent is less than or equal to two pixels, the next two steps 64,66 check whether it is flat-topped (as in FIG. 6) or flat-bottomed (FIG. 7) respectively. If either test holds true, the primitive is entered on the rendering list at 68 with the identifier that a single slope and length need be calculated, as described previously. If the primitive is neither flat-topped nor flat-bottomed, it is entered on the rendering list at 58 with the other primitives identified as being special cases but without a horizontal edge.

The benefit of the present invention is to reduce the processing need in these situations. It may be used to enable the use of a less expensive rendering system, to allow the use of more realistic/attractive 3D models, or to enable more objects to be viewed in the distance than would otherwise be possible.

From reading the present disclosure, other modifications will be apparent to persons skilled in the art. Such modifications may involve other features which are already known in the design, manufacture and use of image processing apparatus and devices and component parts thereof and which may be used instead of or in addition to features already described herein. Although claims have been formulated in this application to particular combinations of features, it should be understood that the scope of the disclosure of the present application also includes any novel feature or novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A method of image processing for rendering a two-dimensional pixel image composed of a plurality of polygonal image primitives, said method comprising the steps of:

(a) sorting the image primitives in relation to their locations within the completed image and generating an ordered list of said primitives:

(b) designating image primitives having a maximum horizontal or maximum vertical dimension of one pixel as degenerate and removing said degenerate primitives from the list prior to rendering:

(c) designating image primitives having a maximum horizontal or maximum vertical dimension of two pixels as special, classifying said special primitives according to their arrangement of vertices, and identifying said special primitives in the list; and (d) rendering the image with the special primitives identified in step (c) as either a single pixel or a line of pixels and for each other primitive, for each scan line crossed by that primitive, ignoring the primitive contribution to and end pixel of that part of each such scan line crossed by the image primitive together with all pixels of a predetermined one of the uppermost and lowermost pixels lines crossed by the image primitive.

2. A method as claimed in claim 1, wherein the right hand pixel of each scan line part covered by a primitive and the lowermost pixel line have their respective primitive contributions ignored in step (d).

3. A method as claimed in claim 1, wherein special primitives classified in step (c) as having a vertical extent of two pixels and a horizontal upper edge of width N pixels are rendered as a single pixel line of width N−1 pixels.

4. A method as claimed in claim 1, wherein special primitives classified in step (c) as having a vertical extent of two pixels and a horizontal lower edge are not rendered.

5. A method as claimed in claim 1, wherein special primitives classified in step (c) as having a maximum horizontal extent of two pixels and a vertical extent of greater than two pixels are rendered as a sloping line of width one pixel.

6. A method as claimed in claim 2, wherein special primitives classified in step (c) as having a vertical extent of two pixels and a horizontal upper edge of width N pixels are rendered as a single pixel line of width N−1 pixels.

7. A method as claimed in claim 2, wherein special primitives classified in step (c) as having a vertical extent of two pixels and a horizontal lower edge are not rendered.

8. A method as claimed in claim 2, wherein special primitives classified in step (c) as having a maximum horizontal extent of two pixels and a vertical extent of greater than two pixels are rendered as a sloping line of width one pixel.

9. A method of image processing for rendering a two-dimensional pixel image composed of a plurality of polygonal image primitives, said method comprising the steps of:

(a) sorting the image primitives in relation to their locations within the completed image and generating an ordered list of said primitives;

(b) designating image primitives having a maximum horizontal or maximum vertical dimension of one pixel as degenerate and removing said degenerate primitives from the list prior to rendering;

(c) designating image primitives having a maximum horizontal or maximum vertical dimension of two pixels as special, classifying said special primitives according to their arrangement of vertices, and identifying said special primitives in the list; and (d) rendering the image with the special primitives identified in step (c) as either a single pixel or a line of pixels and for each other primitive, for each scan line crossed by that primitive, ignoring the primitive contribution to and end pixel of that part of each such scan line crossed by the image primitive together with all pixels of a predetermined one of the uppermost and lowermost pixels lines crossed by the image primitive;

wherein each image primitive has an associated transparency value and the step (a) further comprises deleting from the list the primitives wholly covered by one or more opaque primitives.

10. Image processing apparatus comprising a data processor coupled with first and second memories, the first memory holding image primitive data for processing and the second holding an operating program for the data processor, when operating according to the operating program the data processor providing:

means for sorting the image primitives on the basis of the data in the first memory and in relation to their locations within a completed image and generating an ordered list of said primitives;

means for designating image primitives having a maximum horizontal or maximum vertical dimension of one pixel as degenerate and arranged to remove said degenerate primitives from the list prior to rendering;

means for designating image primitives having a maximum horizontal or maximum vertical dimension of two pixels as special and arranged to classify said special primitives according to their arrangement of vertices, and identify said special primitives in the list; and image rendering means arranged to render an image from the data in the first memory, with the primitives identified as special being rendered as either a single pixel or a line of pixels, and for each other primitive, for each scan line crossed by that primitive, being configured to ignore the primitive contribution to an end pixel of that part of each such scan line crossed by the image primitive together with all pixels of a predetermined one of the uppermost and lowermost pixels lines crossed by the image primitive.

11. Image processing apparatus as claimed in claim 10, further comprising a display device coupled to receive data defining the rendered image from said image processor and arranged to display the image so defined.

* * * * *